United States Patent [19]

Muellner

[11] 4,068,876
[45] Jan. 17, 1978

[54] BUMPER AND COUNTERWEIGHT ARRANGEMENT AND METHOD FOR ASSEMBLING THE SAME

[75] Inventor: Donald R. Muellner, Aurora, Ill.

[73] Assignee: Caterpillar Tractor Co., Peoria, Ill.

[21] Appl. No.: 674,786

[22] Filed: Apr. 8, 1976

[51] Int. Cl.² .......................................... B60R 19/04
[52] U.S. Cl. .................................. 293/69 R; 280/759
[58] Field of Search ............ 293/69 R, 70, 71 R, 293/DIG. 1; 280/759; 151/54

[56] References Cited
U.S. PATENT DOCUMENTS

| 667,339 | 2/1901 | Ruffhead | 151/54 |
|---|---|---|---|
| 2,701,728 | 2/1955 | Miller | 293/69 R |
| 2,797,121 | 6/1957 | Aud | 293/6 RR |
| 2,925,149 | 2/1960 | Hughson | 280/759 |
| 2,967,718 | 1/1961 | Orwig | 280/759 |
| 3,023,024 | 2/1962 | McAdams et al. | 280/759 |
| 3,490,787 | 1/1970 | Latterman et al. | 293/69 R |
| 3,614,135 | 10/1971 | Eid | 280/759 |
| 3,614,136 | 10/1971 | Dent | 293/69 R |

Primary Examiner—Trygve M. Blix
Assistant Examiner—Stuart M. Goldstein
Attorney, Agent, or Firm—Phillips, Moore, Weissenberger, Lempio & Majestic

[57] ABSTRACT

A construction vehicle has a rear bumper assembly mounted on a frame thereof. The bumper assembly comprises a horizontally disposed bottom plate and a plurality of upstanding plates which define a closed compartment having a counterweight disposed therein. The counterweight is attached to the bottom plate by a spacer which extends through the center of gravity of the counterweight and by a pair of bolts attached to opposite ends of the spacer. The counterweight is assembled by attaching a lifting eye to the spacer, lowering and simultaneously centering the counterweight in the compartment, replacing the lifting eye with one of the above-mentioned bolts and attaching the other bolt to the spacer.

20 Claims, 6 Drawing Figures

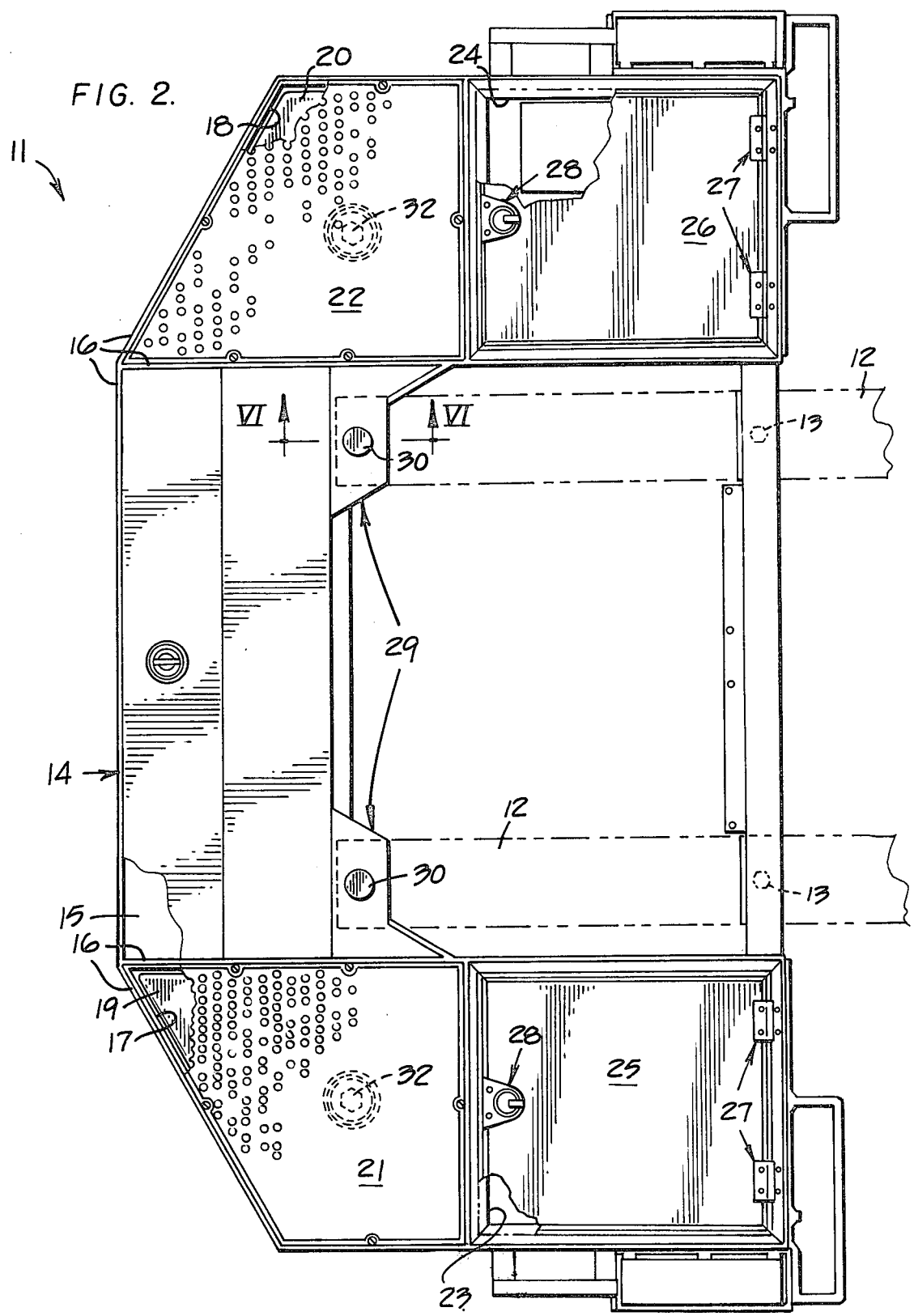

BUMPER AND COUNTERWEIGHT ARRANGEMENT AND METHOD FOR ASSEMBLING THE SAME

BACKGROUND OF THE INVENTION

Construction machines, such as wheel loaders, excavators and the like, oftentimes employ a counterweight arrangement rearwardly thereon to counterbalance workloads imposed forwardly on the vehicle. Such a counterweight arrangement normally comprises a bracket or the like which detachably mounts a counterweight on the vehicle. Many such counterweight arrangements are complex and do not provide for the expeditious mounting thereof on the vehicle. In addition, the counterweights employed therewith are oftentimes exposed exteriorly of the vehicle.

SUMMARY OF THE INVENTION

An object of this invention is to provide an improved counterweight arrangement which is structurally integrated into a bumper assembly for a vehicle. In addition to fully hiding the counterweight for stylizing and related purposes, the counterweight is adapted to be expeditiously mounted on the bumper assembly and expeditiously demounted therefrom. Such mounting can be effected prior to installation of the bumper assembly on the vehicle.

The bumper assembly includes a horizontally disposed bottom plate of rigid construction which has a plurality of upstanding plates secured thereon to define a compartment, retaining the counterweight therein. In the preferred embodiment of this invention, attachment means releasably attaches the counterweight to the bottom plate with such attachment means further comprising self-centering means adapted to automatically center the counterweight in the compartment.

In carrying forth the method steps of this invention to mount the counterweight in the compartment of the bumper assembly, a lifting means is initially attached to the counterweight to lift the counterweight over the compartment. The counterweight is then lowered and simultaneously centered in the compartment and then releasably attached to the bottom plate of the bumper assembly.

BRIEF DESCRIPTION OF THE DRAWINGS

Other objects of this invention will become apparent from the following description and accompanying drawings wherein:

FIG. 2 is an enlarged top plan view of the bumper and counterweight arrangement, generally taken in the direction of arrows II—II in FIG. 1;

DETAILED DESCRIPTION

Figure 1:
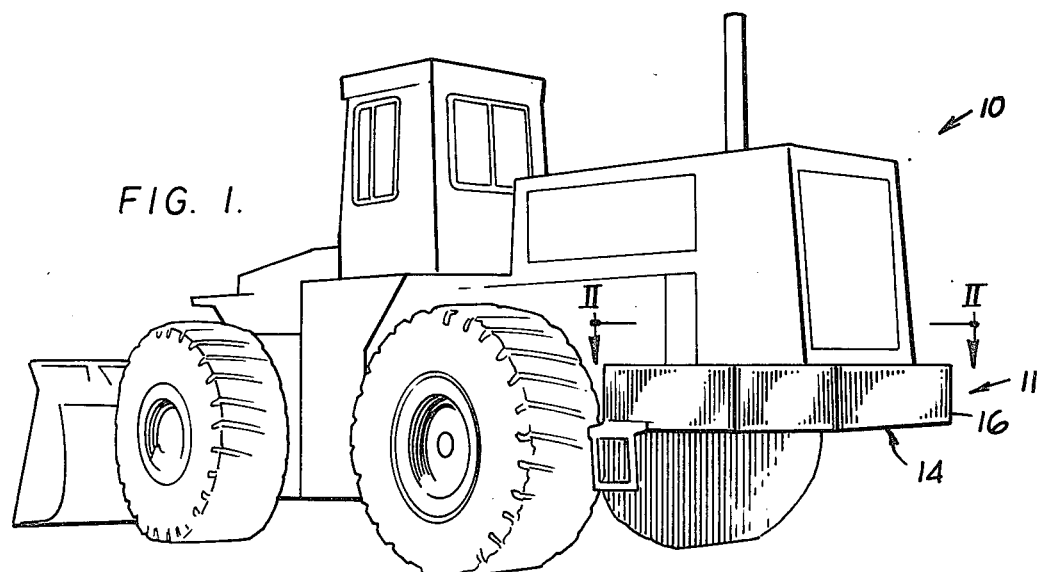
FIG. 1 is a rear perspective view of an articulated wheel loader having the combined bumper and counterweight arrangement of this invention mounted thereon.

FIG. 1 illustrates an articulated wheel loader 10 comprising a combined bumper and counterweight arrangement 11 of this invention mounted rearwardly thereon. Although such arrangement is particularly adapted for use with a wheel loader, it should be understood that it is equally adapted for use, with some modification, with other types of construction vehicles. As shown in FIG. 2, the bumper and counterweight arrangement is adapted to be mounted on a main frame 12 of the vehicle and secured thereto from the underside thereof by a plurality of bolts, two of which are shown by phantom lines at 13.

Arrangement 11 comprises a rear bumper assembly 14, including a horizontally disposed bottom plate 15 and a plurality of upstanding plates 16 structurally integrated with the bottom plate and other standard reinforcing members (not fully shown). The structurally integrated plates define a plurality of closed compartments, including a pair of laterally spaced and rearwardly disposed compartments 17 and 18 mounting counterweights 19 and 20 therein, respectively. Counterweights 19 and 20 are normally covered by flat cover plates 21 and 22, respectively, each releasably secured on the bumper assembly by a plurality of cap screws or the like.

Figure 6:
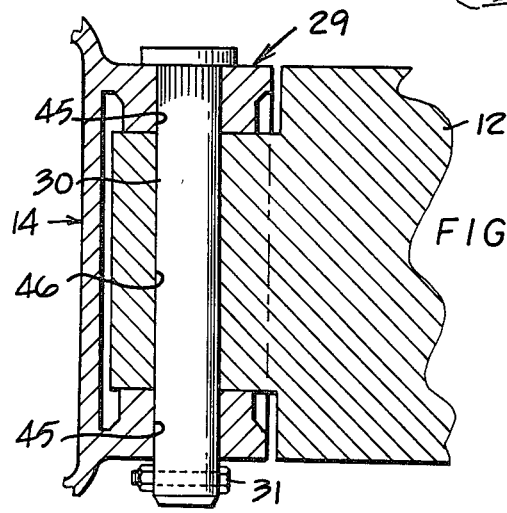
FIG. 6 is an enlarged sectional view, taken in the direction of arrows VI—VI in FIG. 2.

A pair of forwardly disposed compartments 23 and 24 are also defined by the structurally integrated plates of the bumper assembly and are normally closed by covers 25 and 26, respectively. Cover 25, for example, is pivotally mounted on the bumper assembly by hinges 27 and normally held in a closed position by a standard latch 28. Referring to FIGS. 2 and 6, a pair of laterally spaced and bifurcated brackets 29 are integrally secured to the bumper assembly and each attached to a rearward extension of vehicle frame 12 by a lock pin 30, locked in place by a bolt 31.

Figure 4:
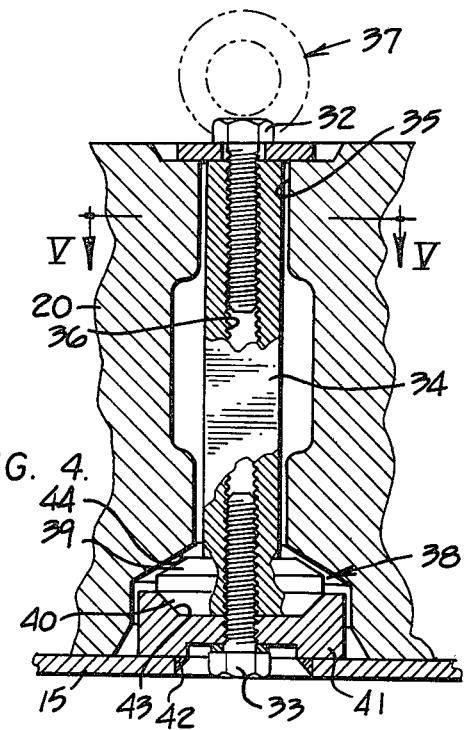
FIG. 4 is an enlarged sectional view, taken in the direction of arrows IV—IV in FIG. 3.
Figure 3:
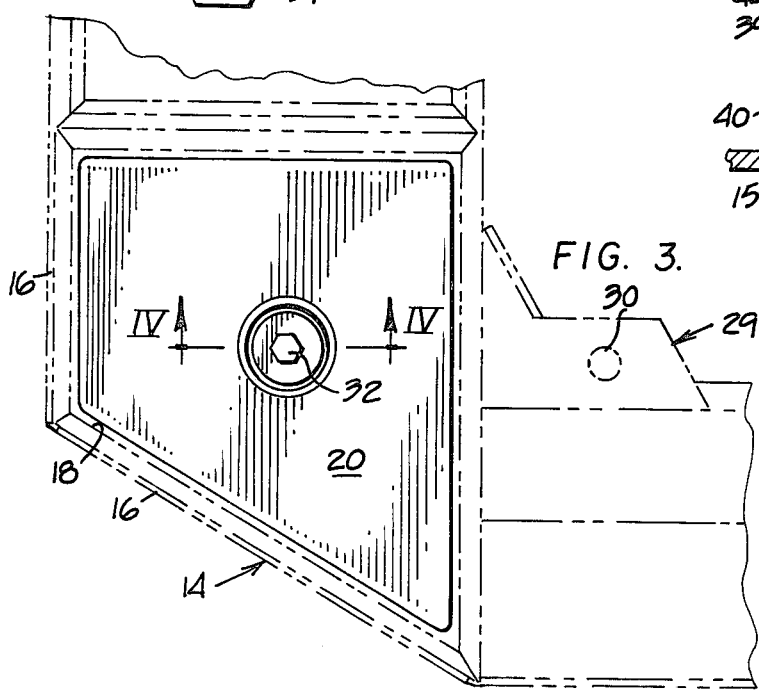
FIG. 3 is a partial top plan view of a corner of the bumper and counterweight arrangement with a bumper assembly thereof shown in phantom line.
Figure 5:
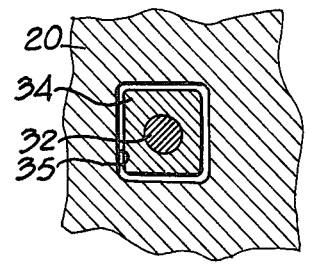
FIG. 5 is a sectional view, taken in the direction of arrows V—V in FIG. 4.

Referring to FIG. 4, each counterweight 19 and 20 is releasably attached to bottom wall 15 of the bumper assembly by attachment means comprising a pair of bolts 32 and 33. The bolts are releasably attached to opposite ends of a spacer 34 which is closely fitted within a vertically disposed aperture 35 which intersects the center of gravity of weight 20. As shown in FIG. 5, the spacer has a square cross section, along with aperture 35, to prevent rotation of the spacer relative to the weight. Screw threads 36 are formed internally on spacer 34 to threadably receive the shank of a lifting means or eye, illustrated by phantom lines at 37 and adapted to be substituted in lieu of bolt 32 as will be hereinafter explained.

An annular or doughnut-shaped centering member 38 is integrally secured to a lower end of spacer 34 and has a pair of frustoconically shaped surfaces 39 and 40 formed on the upper and under sides thereof, respectively. An annular mounting member 41 is secured to bottom plate 15 of the bumper assembly by an annular weld 42, for example. The mounting member defines a frustoconically shaped cavity 43 on the upper side thereof which receives like-shaped lower surface 40 of member 38 when the counterweight is maintained in its illustrated assembled position on the bumper assembly. As will be hereinafter more fully explained, upon lifting of the counterweight out of compartment 18, upper surface 39 of member 38 will engage a mating frustoconically shaped bearing surface 44, formed on the underside of the counterweight, to facilitate such lifting.

The method of attaching the bumper assembly on main frame 12 of the vehicle and premounting the counterweights in compartments 17 and 18 will now be described. Although the counterweights may be mounted in the bumper assembly subsequent to attachment of the bumper assembly to the vehicle, it is preferred that such counterweights be so mounted prior to such attachemnt of the bumper assembly. The following described method assumes that the bumper assembly is detached from the vehicle, that the counterweights are removed from the bumper assembly and that bolt 33 is released from spacer 34.

Upon first inserting spacer 34 upwardly in counterweight to its FIG. 4 position, lifting eye 37 is threadably attached to spacer 34 at threads 36. A suitable hook or the like (not shown) is then inserted into the lifting eye and the counterweight is lifted over compartment 18 to substantially align centering member 38 with cavity 43 of mounting member 41. The counterweight is then lowered and simultaneously centered in the compartment due to the self-centering means provided between lower surface 40 of the centering member and cavity 43.

When the counterweight has been positioned as illustrated in FIG. 4, lifting eye 37 is then threadably removed from spacer 34. The lifting eye is then replaced with bolt 32 and bolt 33 is inserted upwardly through member 41 and is threadably attached to a lower end of spacer 34. Upon the subsequent mounting of counterweight 19 in compartment 17 in a like manner, covers 21 and 22 are then affixed over compartments 17 and 18 to close the same by means of cap screws.

Bores 45 and 46 (FIG. 6), formed through brackets 29 and the rearward end of vehicle frame 12, respectively, are then placed in vertical alignment and pins 30 are dropped therethrough (FIG. 2). Each of the pins is then secured in place by bolt 31. Such a pre-mounting of the bumper assembly permits the operator to safely crawl under the vehicle to secure bolts 13 (FIG. 2) in place to secure the bumper and counterweight arrangement on the vehicle frame.

I claim:

1. A combined bumper and counterweight arrangement mounted on one end of a frame of a vehicle having a work implement mounted on the other end thereof comprising
   a bumper assembly including a horizontally disposed bottom plate and a plurality of upstanding plates secured to said bottom plate to define a compartment therein,
   a counterweight disposed within said compartment and resting on said bottom plate,
   bracket means comprising at least one horizontally disposed bracket mounting said bumper assembly on said frame
   a vertically disposed pin further disposed in vertically aligned bores formed through said bracket and said frame whereby said bumper assembly can be mounted expeditiously on said frame and
   vertically disposed attachment means releasably attaching said counterweight to said bottom plate.

2. The arrangement of claim 1 wherein said attachment means intersects the center of gravity of said counterweight.

3. The arrangement of claim 2 wherein said attachment means comprises a spacer closely fitted within an aperture formed through said counterweight, said spacer and said aperture each having rectangular cross sections for preventing said spacer from rotating relative to said counterweight.

4. The arrangement of claim 2 wherein said attachment means comprises self-centering means for guiding and centering said counterweight on the bottom plate of said bumper assembly.

5. The arrangement of claim 4 wherein said attachment means further comprises a spacer disposed in an aperture formed in said weight, a pair of bolts threadably attached to opposite ends of said spacer and an annular centering member secured on a lower end of said spacer and disposed on the bottom wall of said bumper assembly.

6. The arrangement of claim 5 further comprising an annular mounting member secured on the bottom wall of said bumper assembly to form an integral part thereof and having one of said bolts extending therethrough threadably attached to a lower end of said spacer.

7. The arrangement of claim 6 wherein said self-centering means comprises a frusto-conically shaped surface formed on an underside of said centering member and mounted within a like-shaped frusto-conically shaped cavity formed on an upper side of said mounting member.

8. The arrangement of claim 1 wherein a pair of said compartments are defined in laterally spaced relationship on a rearward end of said bumper assembly and wherein a said counterweight is disposed within each of said compartments.

9. The arrangement of claim 1 further comprising a cover plate detachably mounted on said bumper assembly in covering relationship over said counterweight.

10. The arrangement of claim 9 wherein a plurality of compartments are defined in said bumper assembly with a cover plate covering each said compartment.

11. The arrangement of claim 1 wherein said bracket means comprises a pair of said brackets and a pair of said pins.

12. The arrangement of claim 1 further comprising releasable fastening means disposed forwardly of said bracket means and releasably attaching said bumper assembly on said frame from beneath said vehicle.

13. A method for mounting a counterweight in a compartment defined in a bumper assembly for a vehicle comprising the steps of
   threadably attaching lifting means to an upper side of said counterweight,
   lifting said counterweight by said lifting means over said compartment,
   lowering and simultaneously self-centering said counterweight in said compartment,
   securing said counterweight to said bumper assembly by replacing said lifting means with a bolt threadably attached to the upper side of said counterweight and
   duplicating said attaching, lifting, lowering and securing steps to mount a second counterweight in a second compartment defined in said bumper assembly in laterally spaced relationship relative to said first-mentioned counterweight.

14. The method of claim 13 wherein said lifting step comprises applying a lifting force to said counterweight at least approximately at the center of gravity thereof.

15. The method of claim 13 wherein said lowering and centering steps comprise interengaging mating frustoconically shaped surfaces defined between said counterweight and said bumper assembly.

16. The method of claim 13 further comprising the step of mounting said bumper assembly on a frame of a vehicle.

17. A combined bumper and counterweight arrangement adapted for mounting on a frame of a vehicle comprising a bumper assembly including a horizontally disposed bottom plate and a plurality of upstanding plates secured to said bottom plate to define a compartment therein, a counterweight disposed within said compartment and resting on said bottom plate and attachment means releasably attaching said counterweight to said bottom plate comprising self-centering means for guiding and centering said counterweight on the bottom plate of said bumper assembly, a spacer disposed in an aperture formed in said weight, a pair of bolts threadably attached to opposite ends of said spacer and an annular centering member secured on a lower end of said spacer and disposed on the bottom wall of said bumper assembly.

18. A combined bumper and counterweight arrangement mounted on one end of a frame of a vehicle having a work implement mounted on the other end thereof comprising a bumper assembly including a horizontally disposed bottom plate and a plurality of upstanding plates secured to said bottom plate to define a pair of laterally spaced compartments on a rearward end of said bumper assembly, a counterweight disposed within each of said compartments and resting on said bottom plate, bracket means comprising at least one horizontally disposed bracket mounting said bumper assembly on said frame, and a vertically disposed pin further disposed in vertically aligned bores formed through said bracket and said frame whereby said bumper assembly can be mounted expeditiously on said frame.

19. A method for mounting a counterweight in a compartment defined in a bumper assembly for a vehicle comprising the steps of threadably attaching lifting means to an upper said of said counterweight, lifting said counterweight by said lifting means over said compartment, lowering and simultaneously self-centering said counterweight in said compartment, securing said counterweight to said bumper assembly by replacing and lifting means with a bolt threadably attached to the upper side of said counterweight, and mounting said bumper assembly on a frame of a vehicle by first attaching a pair of brackets of said bumper assembly on said frame and then bolting said bumper assembly to said frame at a location remote from said brackets from beneath said vehicle.

20. The method of claim 19 wherein said attaching step comprises inserting a pin through aligned bores formed through each of said brackets and said frame.

* * * * *

UNITED STATES PATENT OFFICE
CERTIFICATE OF CORRECTION

Patent No. 4,068,876        Dated January 17, 1978

Inventor(s) Donald R. Muellner

It is certified that error appears in the above-identified patent and that said Letters Patent are hereby corrected as shown below:

Col. 3, Claim 3, line 65, change "2" to read --1--;

Col. 4, Claim 4, line 3, change "2" to read --1--.

Signed and Sealed this

Twenty-fifth Day of July 1978

[SEAL]

Attest:

RUTH C. MASON  
Attesting Officer

DONALD W. BANNER  
Commissioner of Patents and Trademarks